United States Patent
Nie et al.

(10) Patent No.: US 12,107,489 B2
(45) Date of Patent: Oct. 1, 2024

(54) SOFT-START METHOD, POWER CONVERTER SYSTEM, AND HOUSEHOLD ENERGY STORAGE SYSTEM

(71) Applicant: FranklinWH Energy Storage Inc., San Jose, CA (US)

(72) Inventors: Hongtao Nie, Shenzhen (CN); Chi Zhang, Shenzhen (CN); Daqing Wang, Shenzhen (CN)

(73) Assignee: FranklinWH Energy Storage Inc., San Jose, CA (US)

( * ) Notice: Subject to any disclaimer, the term of this patent is extended or adjusted under 35 U.S.C. 154(b) by 0 days.

(21) Appl. No.: 18/350,943

(22) Filed: Jul. 12, 2023

(65) Prior Publication Data

US 2023/0387791 A1 Nov. 30, 2023

Related U.S. Application Data

(63) Continuation of application No. PCT/CN2022/094824, filed on May 25, 2022.

(51) Int. Cl.
*H02M 1/36* (2007.01)
*H02M 3/335* (2006.01)

(52) U.S. Cl.
CPC .......... *H02M 1/36* (2013.01); *H02M 3/33569* (2013.01)

(58) Field of Classification Search
CPC .......................... H02M 1/36; H02M 3/33569
See application file for complete search history.

(56) References Cited

U.S. PATENT DOCUMENTS

2013/0088894 A1* 4/2013 Rozman ................ H02M 1/32
363/15
2022/0077767 A1* 3/2022 Wang ................ H02M 3/33573

FOREIGN PATENT DOCUMENTS

CN 109194111 A 1/2019

* cited by examiner

*Primary Examiner* — Rafael O De Leon Domenech
(74) *Attorney, Agent, or Firm* — ANOVA LAW GROUP, PLLC (57) ABSTRACT

Provided are a soft-start method, a power converter system, and a household energy storage system, which are applied to the field of household energy storage technology and are used to improve the soft-start effect of a full-bridge resonant converter. The method includes the following manners: A soft-start process is configured as multiple operating periods, and a duty cycle is adjusted in periods and gradually increases; and in the soft-start process, according to the conversion of the duty cycle, a voltage is slowly output, and the value of the output voltage is gradually increased, so that the operating current in the soft-start process can be effectively controlled, thereby reducing the voltage stress of a power switch transistor when the power switch transistor is hard turned off.

10 Claims, 4 Drawing Sheets

SOFT-START METHOD, POWER CONVERTER SYSTEM, AND HOUSEHOLD ENERGY STORAGE SYSTEM

CROSS-REFERENCE TO RELATED APPLICATION

This application is a continuation application of International Patent Application No. PCT/CN2022/094824, filed on May 25, 2022, the disclosure of which is incorporated herein by reference in its entirety.

TECHNICAL FIELD

The present application relates to the field of household energy storage technology and, in particular, to a soft-start method, a power converter system, and a household energy storage system.

BACKGROUND

A resonant converter can implement zero voltage on of a circular edge power switch device and zero current off of a complex variable power switch and can operate at a very high switch frequency, so that converter efficiency and power density are remarkably improved. Such resonator has high efficiency in resonating a frequency and is widely used in recent years.

When a resonant converter is started, due to the existence of secondary side output capacitance, if the resonant converter is directly started at a resonant frequency, the start moment corresponds to a short circuit, and devices such as a switch transistor and a resonant capacitor are easily damaged. In the existing art, a resonant converter is generally started by a soft-start method. In the existing method, the main method currently adopted is as follows: First, based on a fixed frequency, a duty cycle is increased linearly, if a linear ratio is set too large, the soft-start time may be too long, and if the linear ratio is set too small, a container causes the hard off current of the switch transistor to be too large; and the second is to fix the duty cycle and control the change of a switch frequency, but the overall complexity of a circuit is relatively high.

SUMMARY

The present application provides a soft-start method, a power converter system, and a household energy storage system to reduce the soft-start complexity of a resonant converter.

A soft-start method is applied to a full-bridge resonant converter. The full-bridge resonant converter includes a first switch transistor, a second switch transistor, a third switch transistor, and a fourth switch transistor. The method includes the steps below.

The first switch transistor and the fourth switch transistor are turned on or off at the same time, and the second switch transistor and the third switch transistor are turned on or off at the same time. During a soft-start process, the switch cycle of the first switch transistor, the second switch transistor, the third switch transistor, and the fourth switch transistor remains unchanged. The soft-start process is configured as N operating periods, where N≥2.

In the k-th operating period, where 1≤k≤N−1, the duty cycle of the first switch transistor, the second switch transistor, the third switch transistor, and the fourth switch transistor remains unchanged or gradually increases.

In the (k+1)-th operating period, the duty cycle of the first switch transistor, the second switch transistor, the third switch transistor, and the fourth switch transistor is greater than the duty cycle of the first switch transistor, the second switch transistor, the third switch transistor, and the fourth switch transistor during the k-th operating period.

In the N-th operating period, the duty cycle of the first switch transistor, the second switch transistor, the third switch transistor, and the fourth switch transistor gradually increases to the maximum value.

When the duty cycle of the first switch transistor, the second switch transistor, the third switch transistor, and the fourth switch transistor reaches the maximum value, the output voltage of the full-bridge resonant converter increases to a steady state value.

A power converter system includes a full-bridge resonant converter. The full-bridge resonant converter is configured to perform a soft start by using the preceding soft-start method.

A household energy storage system includes a cloud platform, an energy management system, a power converter system, and a battery management system. The power converter system includes a full-bridge resonant converter. The full-bridge resonant converter is configured to perform a soft start by using the preceding soft-start method.

In the soft-start method, the power converter system, and the household energy storage system provided by the present application, the soft-start process of the full-bridge resonant converter is configured as multiple operating periods. The duty cycle of the full-bridge resonant converter is controlled to gradually increase to the maximum value of the duty cycle, so that the operating current of the full-bridge resonant converter in the soft-start process is more effectively controlled, thereby reducing the voltage stress of a power switch transistor when the power switch transistor is hard turned off. In this manner, the risk of failure of a main power switch transistor due to a stress exceeding a specification in the soft-start process is reduced, and the complexity of the soft-start process is reduced.

BRIEF DESCRIPTION OF DRAWINGS

To illustrate solutions in embodiments of the present application more clearly, the accompanying drawings used in description of the embodiments of the present application are briefly described below. Apparently, the accompanying drawings described below illustrate part of embodiments of the present application, and those of ordinary skill in the art may obtain other accompanying drawings based on the accompanying drawings described below on the premise that no creative work is done.

DETAILED DESCRIPTION

The technical solutions in embodiments of the present application are described hereinafter clearly and completely in connection with the drawings in the embodiments of the present application. Apparently, the described embodiments are part, not all, of embodiments of the present application. Based on the embodiments of the present application, all other embodiments obtained by those skilled in the art without creative work are within the scope of the present application.

Unless otherwise defined, all technical and scientific terms used herein have meanings the same as those commonly understood by those skilled in the art to which the present application pertains. Terms used in the specification of the present application are only used for describing embodiments and not intended to limit the present disclosure. The terms "comprising", "including" or any other variations thereof described in the description, claims and drawings of the present application are intended to encompass a non-exclusive inclusion. The terms such as "first" and "second" in the description, claims, and drawings of the present application are configured to distinguish between different objects and not to describe a particular order.

An "embodiment" mentioned herein means that a particular feature, structure or characteristic described in the embodiments may be included in at least one embodiment of the present application. This phrase occurred in various locations in the specification is not necessary to refer to a same embodiment, nor is an independent or alternative embodiment that is mutually exclusive from other embodiments. It is explicitly and implicitly appreciated by those skilled in the art that embodiments described herein may be combined with other embodiments.

The technical solutions in the embodiments of the present application are described hereinafter clearly and completely in connection with the drawings in the embodiments of the present application. Apparently, the described embodiments are part, not all, of embodiments of the present application. Based on the embodiments of the present application, all other embodiments obtained by those skilled in the art without creative work are within the scope of the present application.

Figure 1:
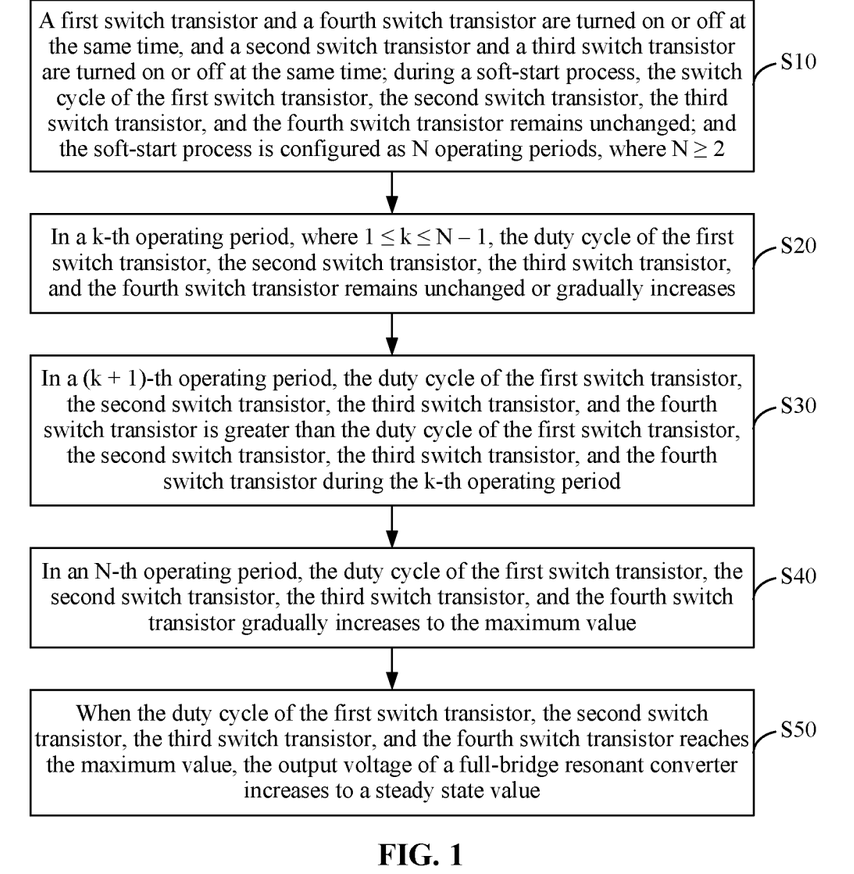
FIG. 1 is a flowchart of a soft-start method according to embodiment one of the present application.

As shown in FIG. 1, an embodiment of the present application provides a soft-start method. The hardware environment in which the method is implemented is a household energy storage system, and the home energy storage system is configured with a computer for storing and executing computer instructions. The hardware of the computer includes, but is not limited to, a microprocessor, an application-specific integrated circuit (ASIC), a field-programmable gate array (FPGA), a digital signal processor (DSP), and an embedded device. The form of the computer is not limited to desktop computers, notebook computers, palmtop computers, and cloud servers.

The method is applied to a full-bridge resonant converter. The full-bridge resonant converter includes a first switch transistor, a second switch transistor, a third switch transistor, and a fourth switch transistor.

In S10, the first switch transistor and the fourth switch transistor are turned on or off at the same time, and the second switch transistor and the third switch transistor are turned on or off at the same time. During a soft-start process, the switch cycle of the first switch transistor, the second switch transistor, the third switch transistor, and the fourth switch transistor remains unchanged. The soft-start process is configured as N operating periods, where N≥2.

Specifically, during the soft-start process, the switch cycle of the first switch transistor, the second switch transistor, the third switch transistor, and the fourth switch transistor remains unchanged. In each switch cycle, the first switch transistor and the fourth switch transistor are turned on or off at the same time, and the second switch transistor and the third switch transistor are turned on or off at the same time. In each switch cycle, the first switch transistor and the fourth switch transistor are turned on at the same time first, and the first switch transistor and the fourth switch transistor are turned off at the same time after first on-duration. At a preset node, the second switch transistor and the third switch transistor are turned on at the same time, and the second switch transistor and the third switch transistor are turned off at the same time after the first on-duration.

The soft-start process is configured as N operating periods. Each operating period includes a preset number of switch cycles. The number of switch cycles included in each operating period gradually increases in chronological order.

It is to be noted that the number of operating periods of the soft-start process is adjusted according to the actual requirements, so that the operating current in the soft-start process is effectively controlled.

In S20, in the k-th operating period, where 1≤k≤N−1, the duty cycle of the first switch transistor, the second switch transistor, the third switch transistor, and the fourth switch transistor remains unchanged or gradually increases.

Specifically, a duty cycle indicates the ratio of the on time of a switch transistor to switch cycle T. In this solution, the on time of switch transistors is equal to the sum of the on-duration of the first switch transistor and the fourth switch transistor plus the on-duration of the second switch transistor and the third switch transistor.

The k-th operating period includes multiple switch cycles. The duty cycle of the first switch transistor, the second switch transistor, the third switch transistor, and the fourth switch transistor remains unchanged, which means the on time of the first switch transistor, the second switch transistor, the third switch transistor, and the fourth switch transistor in each switch cycle is the same. The duty cycle of the first switch transistor, the second switch transistor, the third switch transistor, and the fourth switch transistor gradually increases, which means the on-duration of the first switch transistor, the second switch transistor, the third switch transistor, and the fourth switch transistor in each switch cycle gradually increases.

In S30, in the (k+1)-th operating period, the duty cycle of the first switch transistor, the second switch transistor, the third switch transistor, and the fourth switch transistor is greater than the duty cycle of the first switch transistor, the second switch transistor, the third switch transistor, and the fourth switch transistor during the k-th operating period.

Specifically, in the initial switch cycle of the (k+1)-th operating period, the duty cycle of the first switch transistor, the second switch transistor, the third switch transistor, and the fourth switch transistor is greater than the duty cycle of the first switch transistor, the second switch transistor, the third switch transistor, and the fourth switch transistor in the end switch cycle of the k-th operating period.

It is to be understood that at the end of the k-th operating period, the duty cycle of the first switch transistor, the second switch transistor, the third switch transistor, and the fourth switch transistor is $D_k$. In the (k+1)-th operating period, the duty cycle of the first switch transistor, the second switch transistor, the third switch transistor, and the fourth switch transistor increases from $D_k$ to $D_{k+1}$, where $D_k < D_k+1$.

It is to be noted that in the (k+1)-th operating period, the duty cycle of the first switch transistor, the second switch transistor, the third switch transistor, and the fourth switch transistor gradually increases from $D_k$ to $D_{k+1}$ according to a linear relationship. Alternatively, at the beginning of the (k+1)-th operating period, the duty cycle increases to $D_{k+1}$ and remains at $D_{k+1}$.

In S40, in the N-th operating period, the duty cycle of the first switch transistor, the second switch transistor, the third switch transistor, and the fourth switch transistor gradually increases to the maximum value.

Specifically, in the last operating period of the soft-start process, the duty cycle of the first switch transistor, the second switch transistor, the third switch transistor, and the fourth switch transistor increases to maximum value $D_{max}$.

In S50, when the duty cycle of the first switch transistor, the second switch transistor, the third switch transistor, and the fourth switch transistor reaches the maximum value, the output voltage of the full-bridge resonant converter increases to a steady state value.

Specifically, when the duty cycle of the first switch transistor, the second switch transistor, the third switch transistor, and the fourth switch transistor increases to maximum value $D_{max}$, output voltage $V_{out}$ of the full-bridge resonant converter increases to the steady state value, and the soft-start process ends. In this embodiment of the present application, the soft-start process is configured as multiple operating periods, and a duty cycle is adjusted in periods and gradually increases. In the soft-start process, according to the conversion of the duty cycle, a voltage is slowly output, and the value of the output voltage is gradually increased, so that the operating current in the soft-start process can be effectively controlled, thereby reducing the voltage stress of a power switch transistor when the power switch transistor is hard turned off. In this manner, the risk of failure of the power switch transistor due to the voltage stress exceeding a specification in the soft-start process is reduced, and the effect of the circuit soft start is improved.

In this embodiment, in an optional embodiment, in each switch cycle, the on-duration of the first switch transistor and the fourth switch transistor is equal to the on-duration of the second switch transistor and the third switch transistor.

Specifically, an operating period includes a preset number of switch cycles. In each switch cycle, the on-duration of the first switch transistor and the fourth switch transistor is equal to the on-duration of the second switch transistor and the third switch transistor.

In this embodiment, the on-duration of the first switch transistor, the second switch transistor, the third switch transistor, and the fourth switch transistor are set to be the same, so that a duty cycle is effectively controlled in periods and changes slowly, and the operating current increases effectively.

In this embodiment, in an optional embodiment, from the first operating period to the (N−1)-th operating period, the duty cycle of the first switch transistor, the second switch transistor, the third switch transistor, and the fourth switch transistor in each operating period remains unchanged. The duty cycle increment of the first switch transistor, the second switch transistor, the third switch transistor, and the fourth switch transistor in two adjacent operating periods is Δd, where Δd gradually increases.

Specifically, during the soft-start process, the soft-start process is configured as N operating periods. From the first operating period to the (N−1)-th operating period, the duty cycle of the first switch transistor, the second switch transistor, the third switch transistor, and the fourth switch transistor in each operating period remains unchanged. The duty cycles of the first switch transistor, the second switch transistor, the third switch transistor, and the fourth switch transistor in two adjacent operating periods increase, and the increment is Δd.

In the (N−1)-th operating period, the duty cycle of the first switch transistor, the second switch transistor, the third switch transistor, and the fourth switch transistor increases to the maximum value of the duty cycle.

In each switch cycle in each operating period, the on time of the first switch transistor, the second switch transistor, the third switch transistor, and the fourth switch transistor is the same to ensure that the duty cycle remains unchanged in each operating period.

In an adjacent operating period, the on-duration of the first switch transistor, the second switch transistor, the third switch transistor, and the fourth switch transistor in each switch cycle in the next operating period is increased, and the duty cycle of the first switch transistor, the second switch transistor, the third switch transistor, and the fourth switch transistor is controlled to increase.

In this embodiment, in units of an operating period, the duty cycle of the first switch transistor, the second switch transistor, the third switch transistor, and the fourth switch transistor increases in leaps and bounds, that is, at the junction of two adjacent operating periods, the duty cycle of the first switch transistor, the second switch transistor, the third switch transistor, and the fourth switch transistor increases in leaps and bounds.

For example, in the first operating period, the duty cycle of the first switch transistor, the second switch transistor, the third switch transistor, and the fourth switch transistor is d1. In the second operating period, the duty cycle of the first switch transistor, the second switch transistor, the third switch transistor, and the fourth switch transistor is d2. From the last switch cycle of the first operating period to the first switch cycle of the second operating period, the duty cycle of the first switch transistor, the second switch transistor, the third switch transistor, and the fourth switch transistor linearly increases from d1 to d2. The increase of the duty cycle in other operating periods is the same as this principle, and the details are not repeated here.

In this embodiment, the soft-start process is configured as N operating periods. In each operating period, the duty cycle of the first switch transistor, the second switch transistor, the third switch transistor, and the fourth switch transistor remains unchanged, and the output voltage increases slowly over a certain period of time and finally rapidly increases to the steady state value. In this process, the operating current of the full-bridge resonant converter in the soft-start process can be effectively controlled, thereby reducing the voltage stress of a power switch transistor when the power switch transistor is hard turned off.

Figure 2:
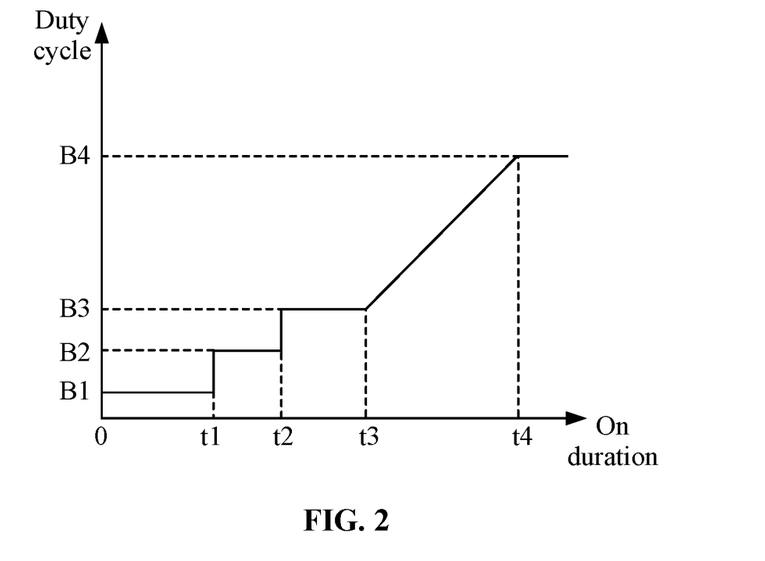
FIG. 2 is a diagram of the soft-start method according to embodiment one of the present application.

In this embodiment, as shown in FIG. 2, in an optional embodiment, the soft-start process is configured as 4 operating periods.

In a first operating period, the duty cycle of the first switch transistor, the second switch transistor, the third switch transistor, and the fourth switch transistor is B1 and remains unchanged.

In a second operating period, the duty cycle of the first switch transistor, the second switch transistor, the third switch transistor, and the fourth switch transistor is B2 and remains unchanged.

In a third operating period, the duty cycle of the first switch transistor, the second switch transistor, the third switch transistor, and the fourth switch transistor is B3 and remains unchanged.

In a fourth operating period, the duty cycle of the first switch transistor, the second switch transistor, the third switch transistor, and the fourth switch transistor gradually increases to maximum value B4, where B4>B3>B2>B1.

Specifically, in the first operating period [0, t1], the duty cycle of the first switch transistor, the second switch transistor, the third switch transistor, and the fourth switch transistor in the first operating period remains at B1. In the second operating period [t1, t2], the duty cycle of the first switch transistor, the second switch transistor, the third switch transistor, and the fourth switch transistor remains at B2.

At time t1, the duty cycle of the first switch transistor, the second switch transistor, the third switch transistor, and the fourth switch transistor increases from B1 to B2.

In the third operating period [t2, t3], the duty cycle of the first switch transistor, the second switch transistor, the third switch transistor, and the fourth switch transistor remains at B3.

At time t2, the duty cycle of the first switch transistor, the second switch transistor, the third switch transistor, and the fourth switch transistor increases from B2 to B3.

In the fourth operating period [t3, t4], the duty cycle of the first switch transistor, the second switch transistor, the third switch transistor, and the fourth switch transistor gradually increases from B3 to maximum value B4.

At time t4, the duty cycle of the first switch transistor, the second switch transistor, the third switch transistor, and the fourth switch transistor increases to B4.

In the first operating period, the second operating period, and the third operating period, the duty cycle of the first switch transistor, the second switch transistor, the third switch transistor, and the fourth switch transistor remains unchanged, and the duty cycle remains a certain increment between two adjacent operating periods. The duty cycle change for each operating period may be expressed according to the following formula:

$$B1+\Delta d1=B2$$

$$B2+\Delta d2=B3$$

$$B3+K_1 t=B4$$

t denotes the on-duration of the first switch transistor, the second switch transistor, the third switch transistor, and the fourth switch transistor in the fourth operating period. $K_1$ denotes the increase rate of the duty cycle of the fourth operating period. $\Delta d1$ denotes the increment of the duty cycle between the first operating period and the second operating period. $\Delta d2$ denotes the increment of the duty cycle between the second operating period and the third operating period.

It is to be noted that a duty cycle indicates the ratio of the on time of each switch transistor to the entire switch cycle. It is to be understood that the longer the on time of the switch transistor in each switch cycle is, the greater the corresponding duty cycle is.

In this embodiment, each operating period includes a preset number of switch cycles. The sum of the on-duration of the first switch transistor, the second switch transistor, the third switch transistor, and the fourth switch transistor in each switch cycle is denoted as the total on-duration in the operating period.

In the first operating period, the on-duration of the first switch transistor, the second switch transistor, the third switch transistor, and the fourth switch transistor in each switch cycle is the same. Thus, in the first operating period, the duty cycle remains at B1.

In the second operating period, the on-duration of the first switch transistor, the second switch transistor, the third switch transistor, and the fourth switch transistor in each switch cycle is the same. The duty cycle remains at B2.

In the third operating period, the on-duration of the first switch transistor, the second switch transistor, the third switch transistor, and the fourth switch transistor in each switch cycle is the same. Thus, the duty cycle remains at B3.

In the fourth operating period, the on-duration of the first switch transistor, the second switch transistor, the third switch transistor, and the fourth switch transistor in each switch cycle gradually increases. The on-duration of the previous switch cycle is less than the on-duration of the next switch cycle. The on-duration of the first switch transistor, the second switch transistor, the third switch transistor, and the fourth switch transistor in each switch cycle is increased, so that in the fourth operating period, the duty cycle gradually increases from B3 to maximum value B4.

In this embodiment, the duty cycle in the soft-start process is controlled and adjusted in periods to control the duty cycle remain unchanged. In this period, the velocity of increase of the output voltage is controlled, so that the output voltage is slowly established at the early period, the voltage stress is reduced, and the risk of circuit failure is reduced.

In this embodiment, in an optional embodiment, the duty cycle of the first switch transistor, the second switch transistor, the third switch transistor, and the fourth switch transistor gradually increases in the k-th operating period. The increment of the duty cycle of the first switch transistor, the second switch transistor, the third switch transistor, and the fourth switch transistor in the (k+1)-th operating period is greater than the increment in the k-th operating period.

Specifically, in the k-th operating period, the duty cycle of the first switch transistor, the second switch transistor, the third switch transistor, and the fourth switch transistor increases linearly in segments. In the first operating period, the duty cycle of the first switch transistor, the second switch transistor, the third switch transistor, and the fourth switch transistor gradually increases from an initial value. The velocity of increase of the duty cycle in each operating period is gradually increased until the duty cycle increases to the maximum value.

In this embodiment, the velocity of increase of the duty cycle of the first switch transistor, the second switch transistor, the third switch transistor, and the fourth switch transistor is controlled in each operating period, so that the velocity of increase of the output voltage is adjusted, and the start rate of the full-bridge resonant converter is adjusted. In this manner, the voltage stress at which the switch transistor is hard turned off during the soft-start process is reduced, and the effect of the circuit soft start is improved.

Figure 3:
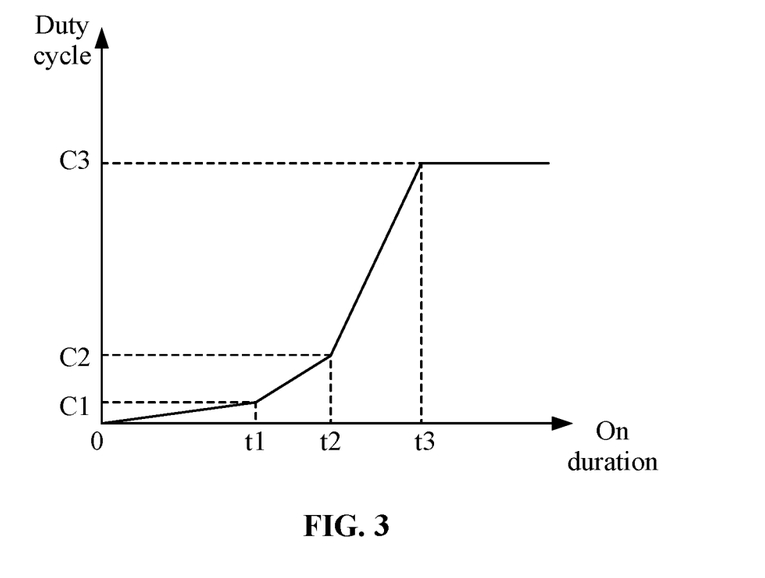
FIG. 3 is a diagram of a soft-start method according to embodiments of the present application.

In this embodiment, as shown in FIG. 3, in an optional embodiment, the soft-start process is configured as 3 operating periods.

In a first operating period, the duty cycle of the first switch transistor, the second switch transistor, the third switch transistor, and the fourth switch transistor gradually increases from 0 to C1.

In a second operating period, the duty cycle of the first switch transistor, the second switch transistor, the third switch transistor, and the fourth switch transistor gradually increases from C1 to C2.

In a third operating period, the duty cycle of the first switch transistor, the second switch transistor, the third switch transistor, and the fourth switch transistor gradually increases from C2 to maximum value C3, where C3>C2>C1.

Specifically, in the first operating period [0, t1], the duty cycle of the first switch transistor, the second switch transistor, the third switch transistor, and the fourth switch transistor gradually increases from 0 to C1.

In the second operating period [t1, t2], the duty cycle of the first switch transistor, the second switch transistor, the third switch transistor, and the fourth switch transistor gradually increases from C1 to C2.

In the third operating period [t2, t3], the duty cycle of the first switch transistor, the second switch transistor, the third switch transistor, and the fourth switch transistor gradually increases from C2 to maximum value C3. When the duty cycle increases to the maximum value, the output voltage gradually increases to the steady state value.

The duty cycle change for each operating period may be expressed according to the following formula:

$$C1=K_2*t$$

$$C2=K_3*t+C1$$

$$C3=K_4*t+C2$$

$K_2$ denotes the increase rate of the duty cycle of the first operating period. $K_3$ denotes the increase rate of the duty cycle of the second operating period. $K_4$ denotes the increase rate of the duty cycle of the third operating period. t denotes the on-duration of the first switch transistor, the second switch transistor, the third switch transistor, and the fourth switch transistor in each switch cycle, where in an optional embodiment, $K_4>K_3>K_2$.

In each operating period, in units of a switch cycle, the on-duration of the first switch transistor, the second switch transistor, the third switch transistor, and the fourth switch transistor gradually increases. For example, in a first switch cycle of the first operating period, the on-duration of the first switch transistor, the second switch transistor, the third switch transistor, and the fourth switch transistor is a1. In a second switch cycle of the first operating period, the on-duration of the first switch transistor, the second switch transistor, the third switch transistor, and the fourth switch transistor is a2, and a2>a1.

It is to be noted that in this embodiment, the on-duration of the last switch cycle of the first operating period is less than the on-duration of the first operating cycle of the second operating period. The on-duration of the last switch cycle of the second operating period is less than the on-duration of the first switch cycle of the third operating period.

In this embodiment, the duty cycle of the first switch transistor, the second switch transistor, the third switch transistor, and the fourth switch transistor is controlled in periods to increase linearly, and the output voltage is effectively controlled to increase to the steady state value according to a certain increase rate, so that a start voltage is quickly reached, and the soft start is implemented. In this manner, the start effect of the soft-start process is ensured, and the risk of failure caused by the circuit exceeding the specification is reduced.

In this embodiment, in an optional embodiment, the N operating periods are configured into a first stage and a second stage. In the first stage, the duty cycle of the first switch transistor, the second switch transistor, the third switch transistor, and the fourth switch transistor remains unchanged in each operating period. In the second stage, the duty cycle of the first switch transistor, the second switch transistor, the third switch transistor, and the fourth switch transistor gradually increases in each operating period.

Specifically, the soft-start process is configured into the first stage and the second stage. The first stage includes at least one operating period. In each operating period of the first stage, the duty cycle of the first switch transistor, the second switch transistor, the third switch transistor, and the fourth switch transistor remains unchanged. The duty cycle of the first switch transistor, the second switch transistor, the third switch transistor, and the fourth switch transistor increases as the operating period increases.

The second stage includes at least one operating period. In each operating period, the duty cycle of the first switch transistor, the second switch transistor, the third switch transistor, and the fourth switch transistor gradually increase linearly.

The duty cycle remains unchanged in an operating period, and in the first stage, the duty cycle is increased according to a certain increment. The output voltage is slowly increased in the first stage. In the second stage, the duty cycle is controlled to increase linearly. The output voltage increases more rapidly to a certain extent, and the start time of the soft-start process is accelerated.

Figure 4:
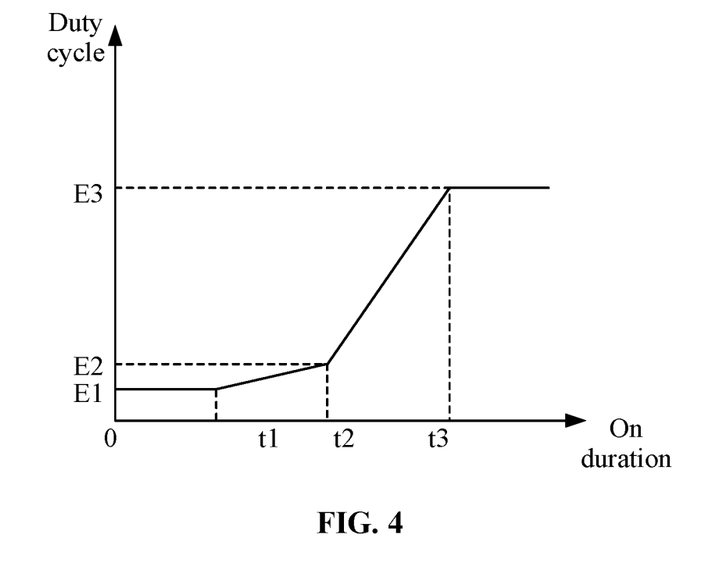
FIG. 4 is a diagram of the soft-start method according to embodiment one of the present application.

In this embodiment, as shown in FIG. 4, in an optional embodiment, the soft-start method is configured as 3 operating periods.

In a first operating period, the duty cycle of the first switch transistor, the second switch transistor, the third switch transistor, and the fourth switch transistor is E1 and remains unchanged.

In a second operating period, the duty cycle of the first switch transistor, the second switch transistor, the third switch transistor, and the fourth switch transistor gradually increases from E1 to E2.

In a third operating period, the duty cycle of the first switch transistor, the second switch transistor, the third switch transistor, and the fourth switch transistor gradually increases from E2 to maximum value E3, where E3>E2>E1.

Specifically, in the first operating period [0, t1], the duty cycle of the first switch transistor, the second switch transistor, the third switch transistor, and the fourth switch transistor remains at E1.

In the second operating period [t1, t2], the duty cycle of the first switch transistor, the second switch transistor, the third switch transistor, and the fourth switch transistor gradually increases from E1 to E2. In the second operating period, the duty cycle of the first switch transistor, the second switch transistor, the third switch transistor, and the fourth switch transistor increases linearly.

In the third operating period [t2, t3], the duty cycle of the first switch transistor, the second switch transistor, the third switch transistor, and the fourth switch transistor gradually increases from E2 to maximum value E3. At this time, the output voltage gradually increases to the steady state value.

In an optional embodiment, the first operating period is configured as a first stage. In the first stage, the duty cycle of the first switch transistor, the second switch transistor, the third switch transistor, and the fourth switch transistor remains unchanged in units of an operating period. The second operating period and the third operating period are configured as a second stage. In the second stage, the duty cycle of the first switch transistor, the second switch transistor, the third switch transistor, and the fourth switch transistor gradually increases to a steady voltage value.

In the second stage, the duty cycle of the first switch transistor, the second switch transistor, the third switch transistor, and the fourth switch transistor in the second operating period increases slowly, so that the output voltage increases slowly. In the third operating period, the duty cycle of the first switch transistor, the second switch transistor, the third switch transistor, and the fourth switch transistor increases rapidly, so that the output voltage rapidly increases to the steady state value, and the start time of the soft-start process is accelerated.

In this embodiment, the soft-start process is configured into the first stage and the second stage. In an operating period of the first stage, the velocity of increase of the duty cycle of the first switch transistor, the second switch transistor, the third switch transistor, and the fourth switch transistor remains unchanged. The increase of the duty cycle of the first switch transistor, the second switch transistor, the third switch transistor, and the fourth switch transistor is controlled in periods or linearly adjusted. In this manner, the velocity of increase of the output voltage is adjusted, so that the velocity of increase of the operating current in the soft-start process is effectively controlled, thereby reducing the risk of circuit failure caused by the voltage stress.

In this embodiment, in an optional embodiment, the first switch transistor and the fourth switch transistor are turned on through a first drive signal, and the second switch transistor and the fourth switch transistor are turned on through a second drive signal. The frequency of the first drive signal is the same as the frequency of the second drive signal, and the phase of the first drive signal differs by 180° from the phase of the second drive signal.

Specifically, the first drive signal is used for driving the first switch transistor and the fourth switch transistor to be turned on. The second drive signal is used for driving the second switch transistor and the third switch transistor to be turned on. The frequency of the first drive signal is the same as the frequency of the second drive signal, and the phase of the first drive signal differs by 180° from the phase of the second drive signal.

In this embodiment, the first switch transistor, the fourth switch transistor, the second switch transistor, and the third switch transistor are driven by the drive signals having a phase difference of 180° respectively to establish the output voltage.

An embodiment of the present application provides a power converter system. The power converter system includes a full-bridge resonant converter. The full-bridge resonant converter is configured to perform a soft start by using the preceding soft-start method.

Figure 5:
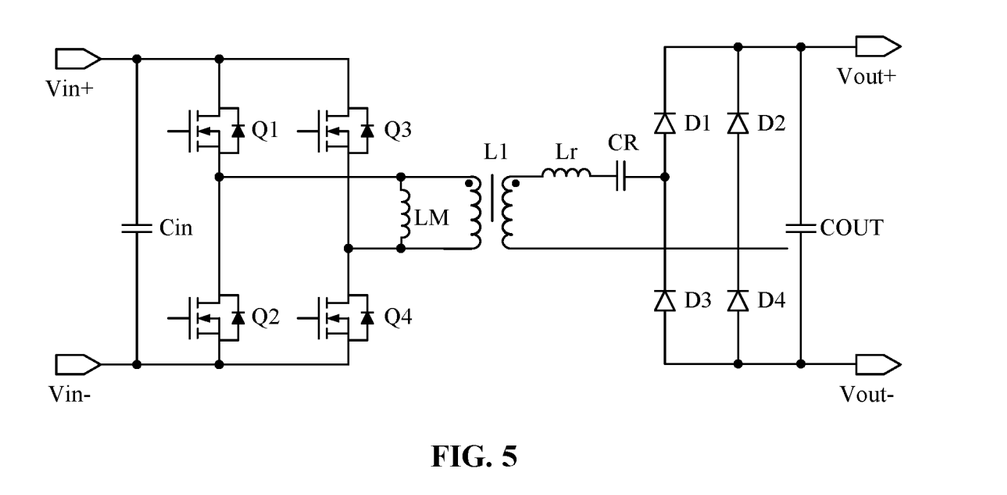
FIG. 5 is a diagram illustrating the circuit structure of a full-bridge resonant converter according to embodiment one of the present application.

Specifically, the circuit structure of the full-bridge resonant converter is shown in FIG. 5. The full-bridge resonant converter includes a first switch transistor Q1, a second switch transistor Q2, a third switch transistor Q3, a fourth switch transistor Q4, a transformer L1, and a rectifier circuit. The first switch transistor Q1 and the third switch transistor are located on a first bridge arm. The second switch transistor Q1 and the fourth switch transistor are located on a second bridge arm. The first bridge arm and the second bridge arm are connected in parallel. The first bridge arm and the second bridge arm are connected to the transformer respectively.

The rectifier circuit is composed of a power diode D1, a power diode D2, a power diode D3, a power diode D4, and an output capacitance Cout. The rectifier circuit is located on the secondary output side of the transformer L1. The secondary output side of the transformer L1 also includes a resonant inductance Lr and a resonant capacitor Cr.

The primary side of the transformer L1 is connected to an exciting inductance Lm.

Specifically, the soft-start process of the full-bridge resonant converter is configured as the manners below.

The first switch transistor Q1 and the fourth switch transistor Q4 are turned on and off at the same time. The second switch transistor Q2 and the third switch transistor Q3 are turned on and off at the same time. During the soft-start process, the switch cycle of the first switch transistor Q1, the second switch transistor Q2, the third switch transistor Q3, and the fourth switch transistor Q4 remains unchanged. The soft-start process is configured as N operating periods, where $N \geq 2$.

In the k-th operating period, where $1 \leq k \leq N-1$, the duty cycle of the first switch transistor Q1, the second switch transistor Q2, the third switch transistor Q3, and the fourth switch transistor Q4 remains unchanged or gradually increases.

In the (k+1)-th operating period, the duty cycle of the first switch transistor Q1, the second switch transistor Q2, the third switch transistor Q3, and the fourth switch transistor Q4 is greater than the duty cycle of the first switch transistor Q1, the second switch transistor Q2, the third switch transistor Q3, and the fourth switch transistor Q4 during the k-th operating period.

In the N-th operating period, the duty cycle of the first switch transistor Q1, the second switch transistor Q2, the third switch transistor Q3, and the fourth switch transistor Q4 gradually increases to the maximum value.

When the duty cycle of the first switch transistor Q1, the second switch transistor Q2, the third switch transistor Q3, and the fourth switch transistor Q4 reaches the maximum value, the output voltage of the full-bridge resonant converter increases to the steady state value.

Figure 6:
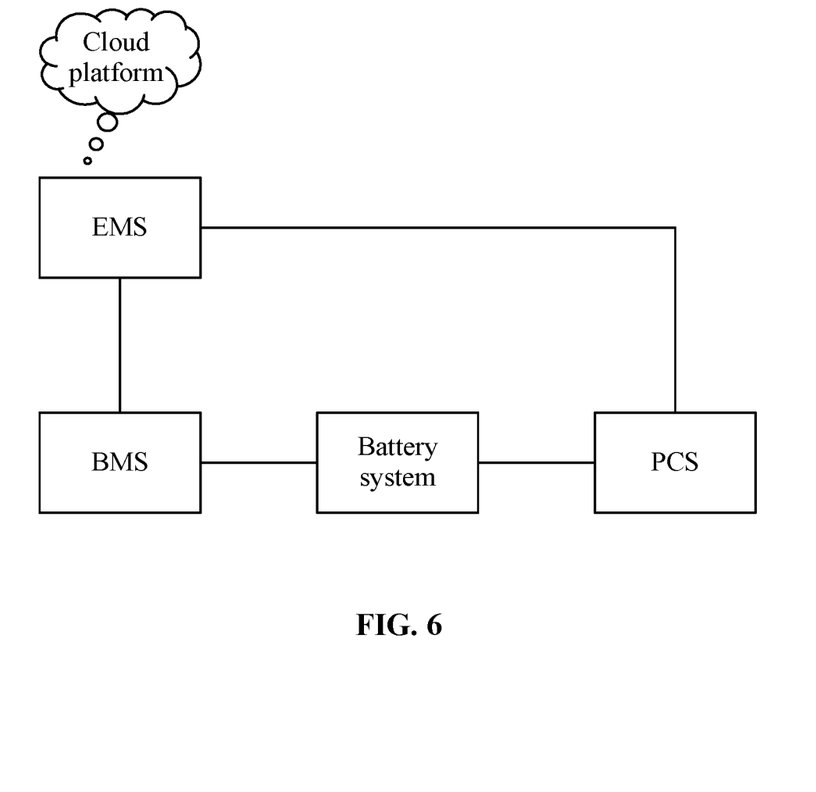
FIG. 6 is a diagram illustrating the structure of a household energy storage system according to embodiment one of the present application.

An embodiment of the present application provides a power converter system. As shown in FIG. 6, the power converter system includes a cloud platform, an energy management system, a power converter system, and a battery management system. The power converter system includes a full-bridge resonant converter. The full-bridge resonant converter is configured to perform a soft start by using the preceding soft-start method.

The cloud platform is configured to provide computing, network, and storage capabilities based on hardware resources and software resource services. The energy management system (EMS) is configured to rationally plan and utilize energy and reduce energy consumption per unit of product. The power converter system (PCS) refers to a system in which an alternating current is converted into a direct current voltage that is rechargeable by a battery to charge the battery, and when the battery is discharged, the direct current of the battery is converted into an alternating current power supply that can be connected to a grid and used by households. In this manner, power supply parameters may satisfy predetermined requirements of the system, and at the same time, power supply communication and information acquisition are provided. The battery management system (BMS) refers to a unit device for battery charge and discharge management and signal acquisition.

It is to be understood by those having ordinary skill in the art that all or part of the processes in the methods of the embodiments described above may be completed by instructing related hardware through computer programs, the computer programs may be stored in a non-volatile computer-readable storage medium, and during the execution of the computer programs, the processes in the method embodiments described above may be included.

It is apparent to those skilled in the art that to describe conveniently and briefly, only the division of the various preceding functional units and modules is used as an example for illustration. In practical applications, the preceding functions may be allocated to different functional units and modules for completion according to requirements, that is, the internal structure of an apparatus is divided into different functional units and modules to perform all or part of the functions described above.

The preceding embodiments are only used to explain the solutions of the present application and not to be construed as limitations thereto; though the present application has been described in detail with reference to the preceding embodiments, those of ordinary skill in the art should understand that modifications can be made on the solutions in the preceding embodiments or equivalent substitutions can be made on part of the features therein; and such modifications or substitutions do not make the corresponding solutions depart from the spirit and scope of the solutions in the embodiments of the present application and are within the scope of the present application.

What is claimed is:

1. A soft-start method, applied to a full-bridge resonant converter, wherein the full-bridge resonant converter comprises a first switch transistor, a second switch transistor, a third switch transistor, and a fourth switch transistor, wherein
    the first switch transistor and the fourth switch transistor are turned on or off at the same time, and the second switch transistor and the third switch transistor are turned on or off at the same time; during a soft-start process, a switch cycle of the first switch transistor, the second switch transistor, the third switch transistor, and the fourth switch transistor remain unchanged; and the soft-start process is configured as N operating periods, wherein N≥2;
    in a k-th operating period, wherein 1≤k≤N−1, a duty cycle of the first switch transistor, the second switch transistor, the third switch transistor, and the fourth switch transistor remains unchanged or gradually increases;
    in a (k+1)-th operating period, the duty cycle of the first switch transistor, the second switch transistor, the third switch transistor, and the fourth switch transistor is greater than the duty cycle of the first switch transistor, the second switch transistor, the third switch transistor, and the fourth switch transistor in the k-th operating period;
    in an N-th operating period, the duty cycle of the first switch transistor, the second switch transistor, the third switch transistor, and the fourth switch transistor gradually increases to a maximum value; and
    in response to the duty cycle of the first switch transistor, the second switch transistor, the third switch transistor, and the fourth switch transistor reaching the maximum value, an output voltage of the full-bridge resonant converter increases to a steady state value,
    wherein from a first operating period to an (N−1)-th operating period, the duty cycle of the first switch transistor, the second switch transistor, the third switch transistor, and the fourth switch transistor in each operating period remains unchanged, and a duty cycle increment of the first switch transistor, the second switch transistor, the third switch transistor, and the fourth switch transistor in two adjacent operating periods is Δd, wherein the Δd gradually increases.

2. The soft-start method according to claim 1, wherein in the switch cycle, on-duration of the first switch transistor and the fourth switch transistor is equal to on-duration of the second switch transistor and the third switch transistor.

3. The soft-start method according to claim 1, wherein the soft-start process is configured as 4 operating periods;
    in a first operating period, the duty cycle of the first switch transistor, the second switch transistor, the third switch transistor, and the fourth switch transistor is B1 and remains unchanged;
    in a second operating period, the duty cycle of the first switch transistor, the second switch transistor, the third switch transistor, and the fourth switch transistor is B2 and remains unchanged;
    in a third operating period, the duty cycle of the first switch transistor, the second switch transistor, the third switch transistor, and the fourth switch transistor is B3 and remains unchanged; and
    in a fourth operating period, the duty cycle of the first switch transistor, the second switch transistor, the third switch transistor, and the fourth switch transistor gradually increases to a maximum value B4,
    wherein B4>B3>B2>B1.

4. The soft-start method according to claim 1, wherein the duty cycle of the first switch transistor, the second switch transistor, the third switch transistor, and the fourth switch transistor gradually increases in the k-th operating period; and an increment of the duty cycle of the first switch transistor, the second switch transistor, the third switch transistor, and the fourth switch transistor in the (k+1)-th operating period is greater than an increment in the k-th operating period.

5. The soft-start method according to claim 4, wherein the soft-start process is configured as three operating periods;
    in a first operating period, the duty cycle of the first switch transistor, the second switch transistor, the third switch transistor, and the fourth switch transistor gradually increases from 0 to C1;
    in a second operating period, the duty cycle of the first switch transistor, the second switch transistor, the third switch transistor, and the fourth switch transistor gradually increases from C1 to C2; and
    in a third operating period, a duty cycle of the first switch transistor, the second switch transistor, the third switch transistor, and the fourth switch transistor gradually increases from C2 to a maximum value C3,
    wherein C3>C2>C1.

6. A soft-start method, applied to a full-bridge resonant converter, wherein the full-bridge resonant converter comprises a first switch transistor, a second switch transistor, a third switch transistor, and a fourth switch transistor, wherein
    the first switch transistor and the fourth switch transistor are turned on or off at the same time, and the second switch transistor and the third switch transistor are turned on or off at the same time; during a soft-start process, a switch cycle of the first switch transistor, the second switch transistor, the third switch transistor, and the fourth switch transistor remain unchanged; and the soft-start process is configured as N operating periods, wherein N≥2;
    in a k-th operating period, wherein 1≤k≤N−1, a duty cycle of the first switch transistor, the second switch transistor, the third switch transistor, and the fourth switch transistor remains unchanged or gradually increases;
    in a (k+1)-th operating period, the duty cycle of the first switch transistor, the second switch transistor, the third switch transistor, and the fourth switch transistor is greater than the duty cycle of the first switch transistor, the second switch transistor, the third switch transistor, and the fourth switch transistor in the k-th operating period;

in an N-th operating period, the duty cycle of the first switch transistor, the second switch transistor, the third switch transistor, and the fourth switch transistor gradually increases to a maximum value; and in response to the duty cycle of the first switch transistor, the second switch transistor, the third switch transistor, and the fourth switch transistor reaching the maximum value, an output voltage of the full-bridge resonant converter increases to a steady state value, wherein the N operating periods are configured into a first stage and a second stage; in the first stage, the duty cycle of the first switch transistor, the second switch transistor, the third switch transistor, and the fourth switch transistor remains unchanged in each operating period; and in the second stage, the duty cycle of the first switch transistor, the second switch transistor, the third switch transistor, and the fourth switch transistor gradually increases in each operating period.

7. The soft-start method according to claim 1, wherein the first switch transistor and the fourth switch transistor are turned on through a first drive signal, and the second switch transistor and the fourth switch transistor are turned on through a second drive signal, wherein a frequency of the first drive signal is the same as a frequency of the second drive signal, and a phase of the first drive signal differs by 180° from a phase of the second drive signal.

8. A power converter system, comprising a full-bridge resonant converter, wherein the full-bridge resonant converter is configured to perform a soft start by using the soft-start method according to claim 1.

9. A household energy storage system, comprising a cloud platform, an energy management system, a power converter system, and a battery management system, wherein the power converter system comprises a full-bridge resonant converter, and the full-bridge resonant converter is configured to perform a soft start by using the soft-start method according to claim 1.

10. The soft-start method according to claim 6, wherein the soft-start method is configured as three operating periods;

in a first operating period, the duty cycle of the first switch transistor, the second switch transistor, the third switch transistor, and the fourth switch transistor is E1 and remains unchanged;

in a second operating period, the duty cycle of the first switch transistor, the second switch transistor, the third switch transistor, and the fourth switch transistor gradually increases from E1 to E2; and in a third operating period, a duty cycle of the first switch transistor, the second switch transistor, the third switch transistor, and the fourth switch transistor gradually increases from E2 to a maximum value E3, wherein E3>E2>E1.

* * * * *